US011287729B2

(12) United States Patent
Sakata et al.

(10) Patent No.: US 11,287,729 B2
(45) Date of Patent: Mar. 29, 2022

(54) LIGHT SOURCE DEVICE AND PROJECTOR

(71) Applicant: SEIKO EPSON CORPORATION, Tokyo (JP)

(72) Inventors: Hidefumi Sakata, Kamiina-gun (JP); Junichi Suzuki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/524,621

(22) Filed: Jul. 29, 2019

(65) Prior Publication Data
US 2020/0033709 A1 Jan. 30, 2020

(30) Foreign Application Priority Data

Jul. 30, 2018 (JP) .............................. JP2018-142461

(51) Int. Cl.
G03B 21/20 (2006.01)
G02B 27/12 (2006.01)
G03B 21/00 (2006.01)

(52) U.S. Cl.
CPC ........... *G03B 21/204* (2013.01); *G02B 27/12* (2013.01); *G03B 21/006* (2013.01); *G03B 21/208* (2013.01); *G03B 21/2013* (2013.01); *G03B 21/2046* (2013.01); *G03B 21/2053* (2013.01); *G03B 21/2073* (2013.01)

(58) Field of Classification Search
CPC ............... G03B 21/204; G03B 21/006; G03B 21/2013; G03B 21/2046; G03B 21/2053; G03B 21/2073; G03B 21/208; G02B 27/12

USPC ......................................................... 353/20
See application file for complete search history.

(56) References Cited

U.S. PATENT DOCUMENTS 8,602,581 B1 12/2013 Kaihotsu
2006/0164857 A1* 7/2006 Morejon .............. G02B 27/149
362/555

(Continued)

FOREIGN PATENT DOCUMENTS

CN 101151908 A 3/2008
JP 2007-065012 A 3/2007

(Continued)

*Primary Examiner* — Jerry L Brooks
(74) *Attorney, Agent, or Firm* — Oliff PLC

(57) ABSTRACT

A light source device includes a light source that emits first and second excitation lights, a first wavelength conversion section including a first phosphor, and configured to convert the first excitation light into first fluorescence having a first wavelength band, a second wavelength conversion section including a second phosphor, and configured to convert the second excitation light into second fluorescence having a second wavelength band, and a light combining section that combines the first fluorescence and the second fluorescence. A first side surface of the first wavelength conversion section and a second side surface of the second wavelength conversion section are opposed to each other, the first fluorescence is emitted from a first end surface of the first wavelength conversion section toward the light combining section, and the second fluorescence is emitted from a first end surface of the second wavelength conversion section toward the light combining section.

20 Claims, 8 Drawing Sheets

(56) References Cited

U.S. PATENT DOCUMENTS

| | | | | |
|---|---|---|---|---|
| 2006/0227570 A1* | 10/2006 | Rutherford | ............ | H04N 9/315 |
| | | | | 362/612 |
| 2007/0193278 A1* | 8/2007 | Polacek | ................... | A61F 7/10 |
| | | | | 62/3.2 |
| 2009/0078949 A1 | 3/2009 | Bechtel et al. | | |
| 2009/0219488 A1* | 9/2009 | Dufour | ................. | G09G 3/002 |
| | | | | 353/20 |
| 2010/0328611 A1* | 12/2010 | Silverstein | ......... | G03B 21/2053 |
| | | | | 353/7 |
| 2012/0212711 A1* | 8/2012 | Goto | ................. | G02B 19/0014 |
| | | | | 353/102 |
| 2016/0266297 A1 | 9/2016 | Hikmet et al. | | |
| 2018/0024425 A1* | 1/2018 | Fujita | ................ | G03B 21/2066 |
| | | | | 362/84 |
| 2020/0026169 A1* | 1/2020 | Chang | ............... | G03B 21/2013 |

FOREIGN PATENT DOCUMENTS

| | | |
|---|---|---|
| JP | 2008-536266 A | 9/2008 |
| JP | 2014-022187 A | 2/2014 |
| JP | 2016-115877 A | 6/2016 |
| JP | 2016-537770 A | 12/2016 |
| WO | 2006/054203 A1 | 5/2006 |
| WO | 2006-104907 A1 | 10/2006 |
| WO | 2015-058979 A1 | 4/2015 |

* cited by examiner

LIGHT SOURCE DEVICE AND PROJECTOR

The present application is based on, and claims priority from JP Application Ser. No. 2018-142461, filed Jul. 30, 2018, the disclosure of which is hereby incorporated by reference herein in its entirety.

BACKGROUND

1. Technical Field

The present disclosure relates to a light source device and a projector.

2. Related Art

As a light source device used for a projector, there is proposed a light source device using fluorescence emitted from a phosphor when irradiating the phosphor with excitation light emitted from a light emitting element. In International Publication No. WO2006/054203 (Document 1), there is disclosed a light source device which is provided with a wavelength conversion member shaped like a flat plate, and a light emitting diode (LED) for emitting excitation light, and has a configuration of making the excitation light enter the wavelength conversion member from a surface large in area, and emitting the converted light from a surface small in area of the wavelength conversion member.

As described in Document 1, by making the light emitted from the LED enter the wavelength conversion member, it is possible to obtain light different in wavelength from the light emitted from the LED. For example, when the wavelength conversion member includes a yellow phosphor, it is possible to obtain yellow light from blue light emitted from the LED. However, in order to obtain white light necessary for a light source device for a projector, it is necessary to separately provide a light source for emitting the blue light, and an optical system such as a color combining element for combining the blue light and the yellow light with each other in addition to the light source device of Document 1. As a result, there is a problem that the light source device grows in size. Further, also when obtaining colored light other than the white light, there is a problem that the light source device grows in size due to the optical system for combining the fluorescence and other colored light with each other.

SUMMARY

Alight source device according to an aspect of the present disclosure includes a light source configured to emit first excitation light and second excitation light, a first wavelength conversion section including a first phosphor, and configured to convert the first excitation light into first fluorescence having a first wavelength band different from a wavelength band of the first excitation light, a second wavelength conversion section including a second phosphor, and configured to convert the second excitation light into second fluorescence having a second wavelength band different from a wavelength band of the second excitation light and the first wavelength band, and a light combining section configured to combine the first fluorescence emitted from the first wavelength conversion section and the second fluorescence emitted from the second wavelength conversion section with each other. The first wavelength conversion section has a first end surface and a second end surface opposed to each other, and a first side surface crossing the first end surface and the second end surface. The second wavelength conversion section has a third end surface and a fourth end surface opposed to each other, and a second side surface crossing the third end surface and the fourth end surface. The first side surface of the first wavelength conversion section and the second side surface of the second wavelength conversion section are opposed to each other. The first fluorescence is emitted from the first end surface of the first wavelength conversion section toward the light combining section, and the second fluorescence is emitted from the third end surface of the second wavelength conversion section toward the light combining section.

In the light source device according to the aspect of the present disclosure, the first wavelength conversion section may have a third side surface crossing the first end surface and the second end surface, the second wavelength conversion section may have a fourth side surface crossing the third end surface and the fourth end surface, the first excitation light may enter the first wavelength conversion section from the third side surface of the first wavelength conversion section, and the second excitation light may enter the second wavelength conversion section from the fourth side surface of the second wavelength conversion section.

In the light source device according to the aspect of the present disclosure, the light source may include a first light emitting diode disposed so as to be opposed to the third side surface of the first wavelength conversion section, and configured to emit the first excitation light, and a second light emitting diode disposed so as to be opposed to the fourth side surface of the second wavelength conversion section, and configured to emit the second excitation light.

The light source device according to the aspect of the present disclosure may further include a control section configured to individually control an intensity of the first excitation light to be emitted from the first light emitting diode and an intensity of the second excitation light emitted from the second light emitting diode.

In the light source device according to the aspect of the present disclosure, the light combining section may include a dichroic prism provided to one of the first end surface of the first wavelength conversion section and the third end surface of the second wavelength conversion section, and having a dichroic mirror configured to reflect one of the first fluorescence and the second fluorescence and transmit the other of the first fluorescence and the second fluorescence, and a prism provided to the other of the first end surface of the first wavelength conversion section and the third end surface of the second wavelength conversion section, and having a reflecting surface configured to reflect one of the first fluorescence and the second fluorescence toward the dichroic prism.

In the light source device according to the aspect of the present disclosure, the dichroic prism may have contact with the third end surface of the second wavelength conversion section.

In the light source device according to the aspect of the present disclosure, the prism may have contact with the first end surface of the first wavelength conversion section.

In the light source device according to the aspect of the present disclosure, the first side surface of the first wavelength conversion section and the second side surface of the second wavelength conversion section may be opposed to each other via an air layer.

In the light source device according to the aspect of the present disclosure, the first wavelength band may be a blue wavelength band, and the second wavelength band may be a yellow wavelength band.

The light source device according to the aspect of the present disclosure may further include a third wavelength conversion section including a third phosphor, and configured to emit third fluorescence having a third wavelength band different from the first wavelength band and the second wavelength band, wherein the light combining section may combine the first fluorescence, the second fluorescence and the third fluorescence with each other.

In the light source device according to the aspect of the present disclosure, the light source may emit third excitation light, and the third wavelength conversion section may convert the third excitation light into the third fluorescence having the third wavelength band different from a wavelength band of the third excitation light.

In the light source device according to the aspect of the present disclosure, the first wavelength band may be a blue wavelength band, the second wavelength band may be a green wavelength band and the third wavelength band may be a red wavelength band.

The light source device according to the aspect of the present disclosure may further include an angle conversion element which is disposed at a light exit side of the light combining section, which includes an end surface of incidence of light and a light exit end surface, and which makes a diffusion angle in the light exit end surface smaller than a diffusion angle in the end surface of incidence of light.

The light source device according to the aspect of the present disclosure may further include a reflective polarization element disposed at a light exit side of the light combining section, and configured to transmit light with a first polarization direction and reflect light with a second polarization direction different from the first polarization direction.

A light source device according to another aspect of the present disclosure includes a light source configured to emit light, a first wavelength conversion section including a first phosphor, and configured to convert the light emitted from the light source into first fluorescence, and emit the first fluorescence from a first light exit surface, a second wavelength conversion section disposed in parallel to the first wavelength conversion section, including a second phosphor, and configured to convert the light emitted from the light source into second fluorescence, and emit the second fluorescence from a second light exit surface, a prism disposed so as to be opposed to the first light exit surface, and configured to reflect the first fluorescence emitted from the first wavelength conversion section, and a dichroic prism disposed so as to be opposed to the prism and the second light exit surface, and configured to combine the first fluorescence emitted from the prism and the second fluorescence emitted from the second wavelength conversion section with each other to emit light obtained by combining the first fluorescence and the second fluorescence with each other, wherein the first fluorescence and the second fluorescence are different in wavelength band from each other.

A projector according to another aspect of the present disclosure includes the light source device according to any one of the above aspects of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

Hereinafter, a first embodiment of the present disclosure will be described using FIG. 1 through FIG. 5.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

Figure 1:
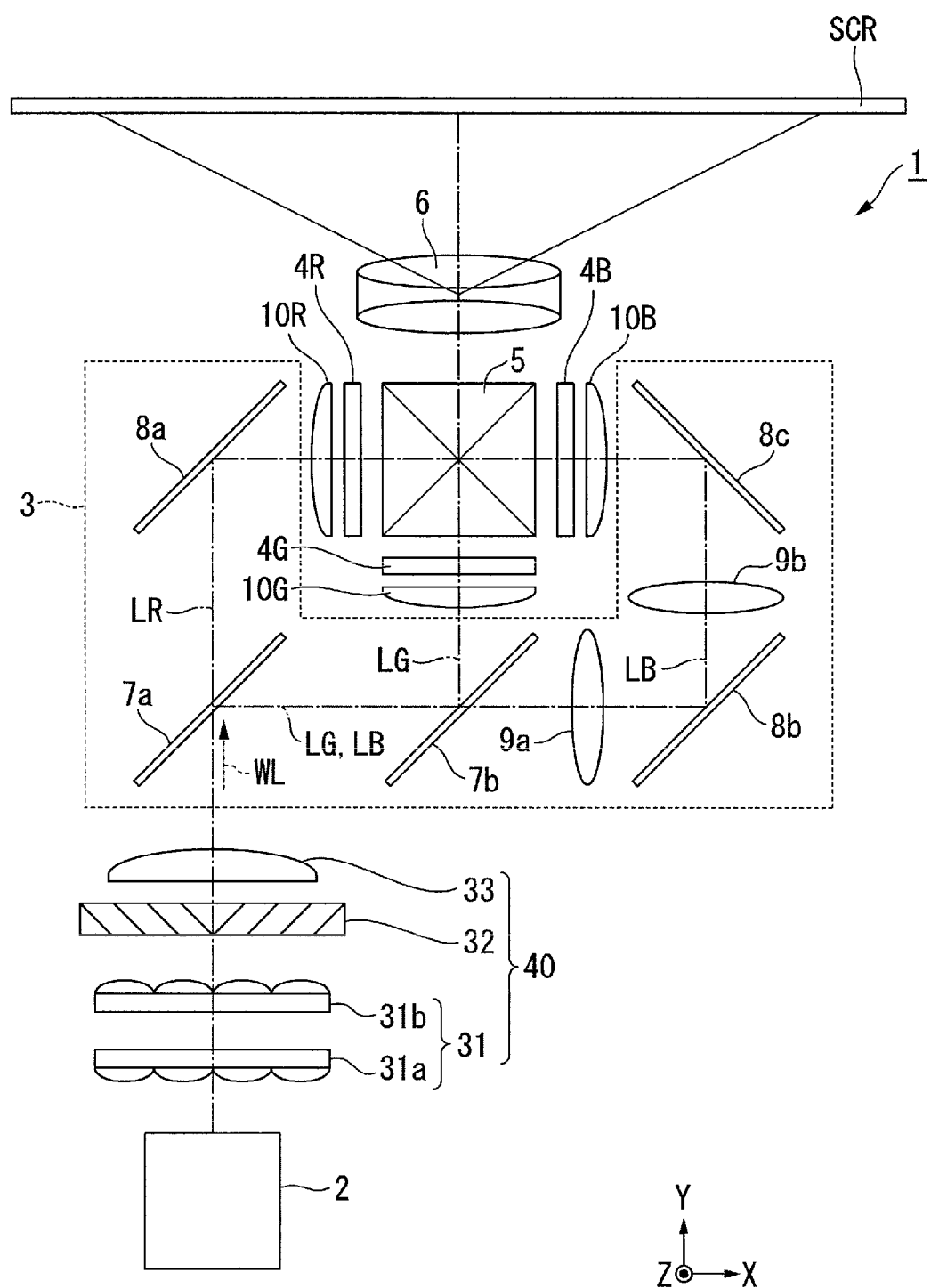
FIG. 1 is a schematic configuration diagram of a projector according to a first embodiment.

FIG. 1 is a schematic configuration diagram of the projector 1 according to the first embodiment.

The projector 1 according to the first embodiment is a projection-type image display device for projecting a color image on a screen (a projection target surface) SCR. The projector 1 uses three light modulation devices corresponding to respective colored light, namely red light LR, green light LG and blue light LB.

As shown in FIG. 1, the projector 1 is provided with a light source device 2, a homogenous illumination optical system 40, a color separation optical system 3, a light modulation device 4R, a light modulation device 4G, a light modulation device 4B, a combining optical system 5 and a projection optical device 6.

The light source device 2 emits illumination light WL toward the homogenous illumination optical system 40. The detailed configuration of the light source device 2 will be described later in detail.

The homogenous illumination optical system 40 is provided with an integrator optical system 31, a polarization conversion element 32 and a superimposing optical system 33. The integrator optical system 31 is provided with a first lens array 31a and a second lens array 31b. The homogenous illumination optical system 40 homogenizes the intensity distribution of the illumination light WL emitted from the light source device 2 in each of the light modulation device 4R, the light modulation device 4G and the light modulation device 4B as illumination target areas. The illumination light WL having been emitted from the homogenous illumination optical system 40 enters the color separation optical system 3.

The color separation optical system 3 separates the illumination light WL as white light into the red light LR, the green light LG and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and reflects the red light LR, which has been transmitted through the first dichroic mirror 7a, toward the light modulation device 4R. Meanwhile, the second reflecting mirror 8b and the third reflecting mirror 8c are disposed in the light path of the blue light LB, and reflect the blue light LB, which has been transmitted through the second dichroic mirror 7b, toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G and the light modulation device 4B, there are used, for example, transmissive liquid crystal panels. Further, on the incident side and the exit side of the liquid crystal panel, there are disposed polarization plates (not shown), respectively, and thus, there is formed a configuration of transmitting only the linearly polarized light with a specific direction.

On the incident side of the light modulation device 4R, the light modulation device 4G and the light modulation device 4B, there are disposed a field lens 10R, a field lens 10G and a field lens 10B, respectively. The field lens 10R, the field lens 10G and the field lens 10B collimate principal rays of the red light LR, the green light LG and the blue light LB entering the light modulation device 4R, the light modulation device 4G and the light modulation device 4B, respectively.

The combining optical system 5 combines the image light corresponding to the red light LR, the image light corresponding to the green light LG and the image light corresponding to the blue light LB with each other in response to incidence of the image light respectively emitted from the light modulation device 4R, the light modulation device 4G and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The light source device 2 will hereinafter be described.

Figure 2:
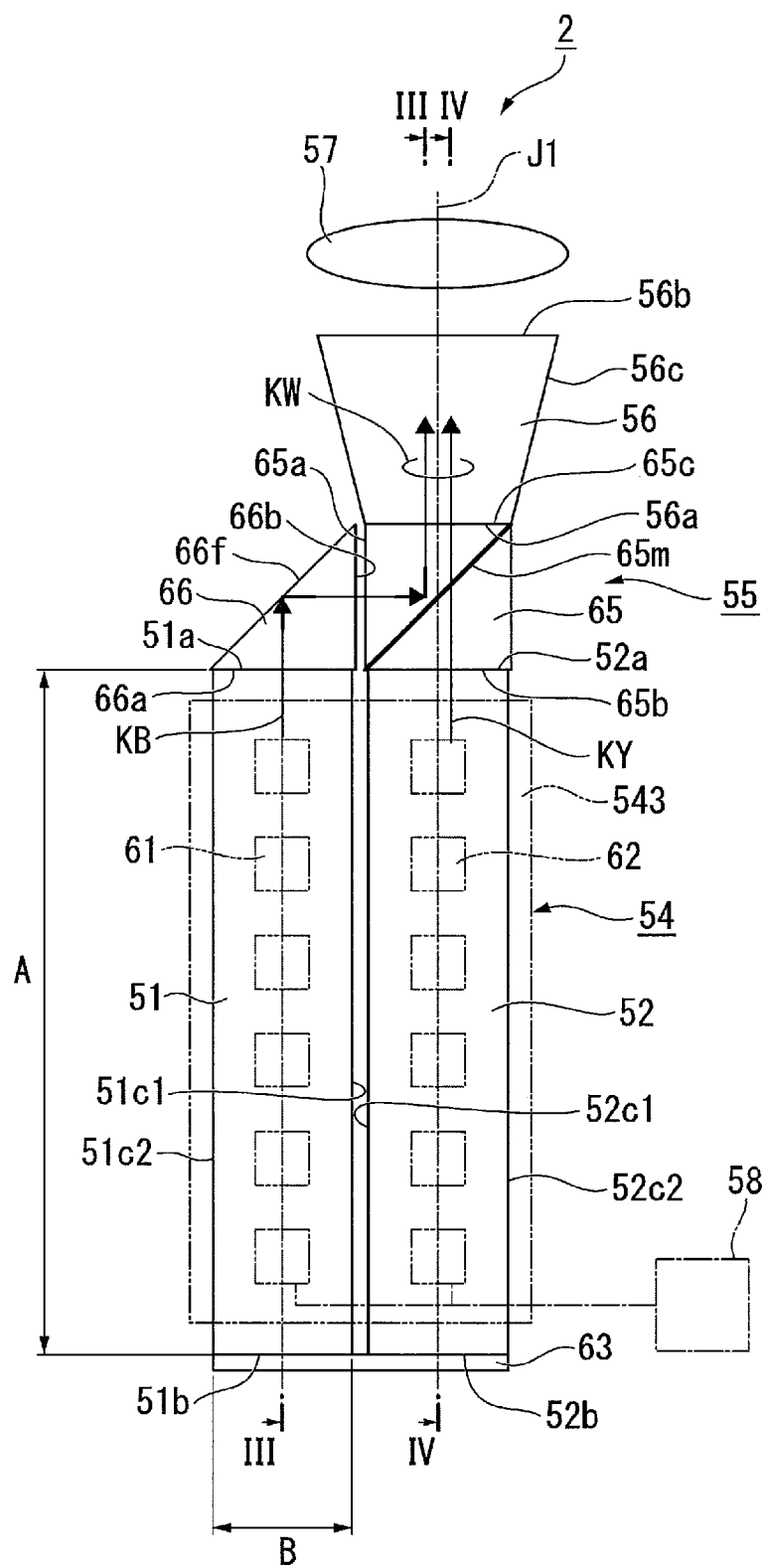
FIG. 2 is a schematic configuration diagram of a light source device according to the first embodiment.
Figure 3:
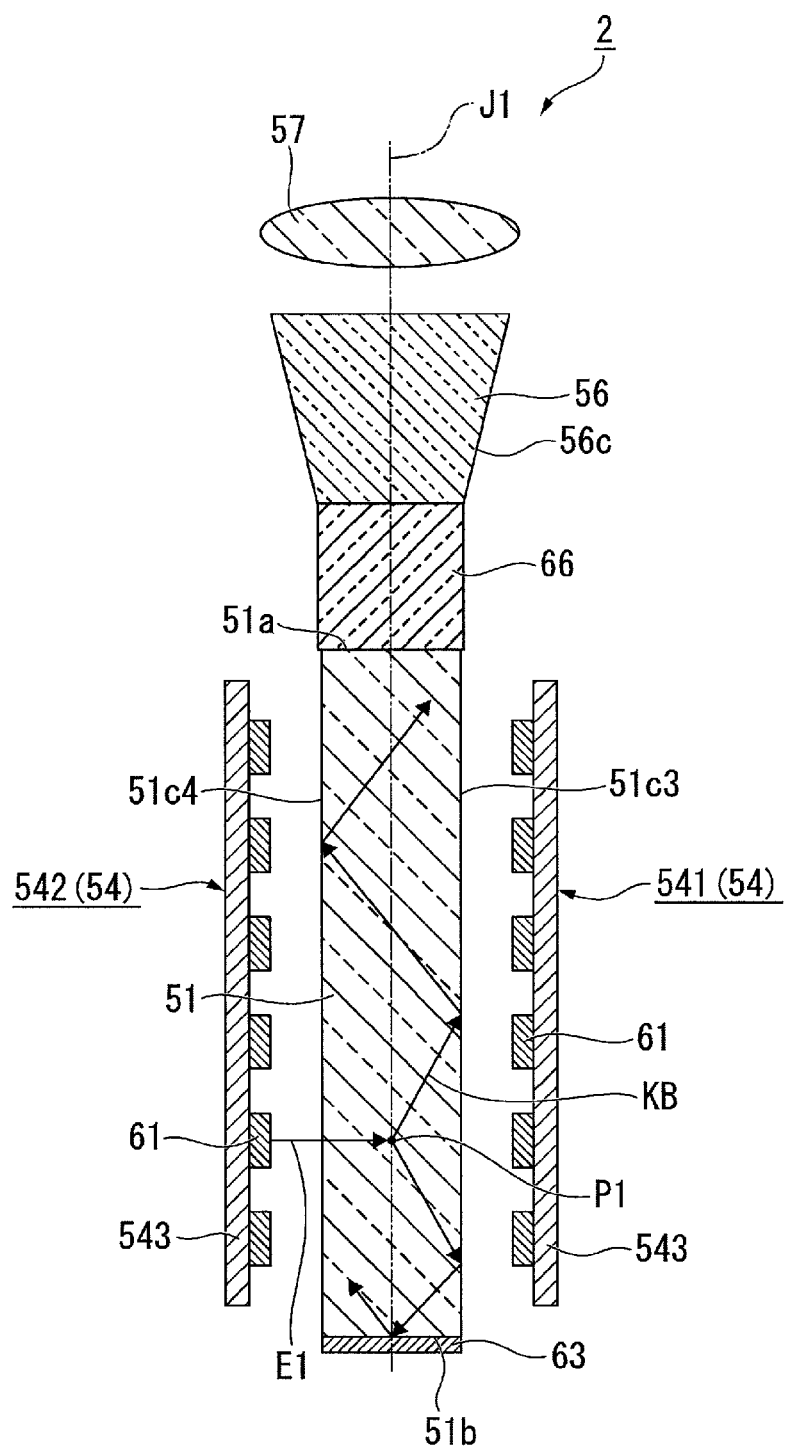
FIG. 3 is a cross-sectional view of the light source device along the line III-III shown in FIG. 2.
Figure 4:
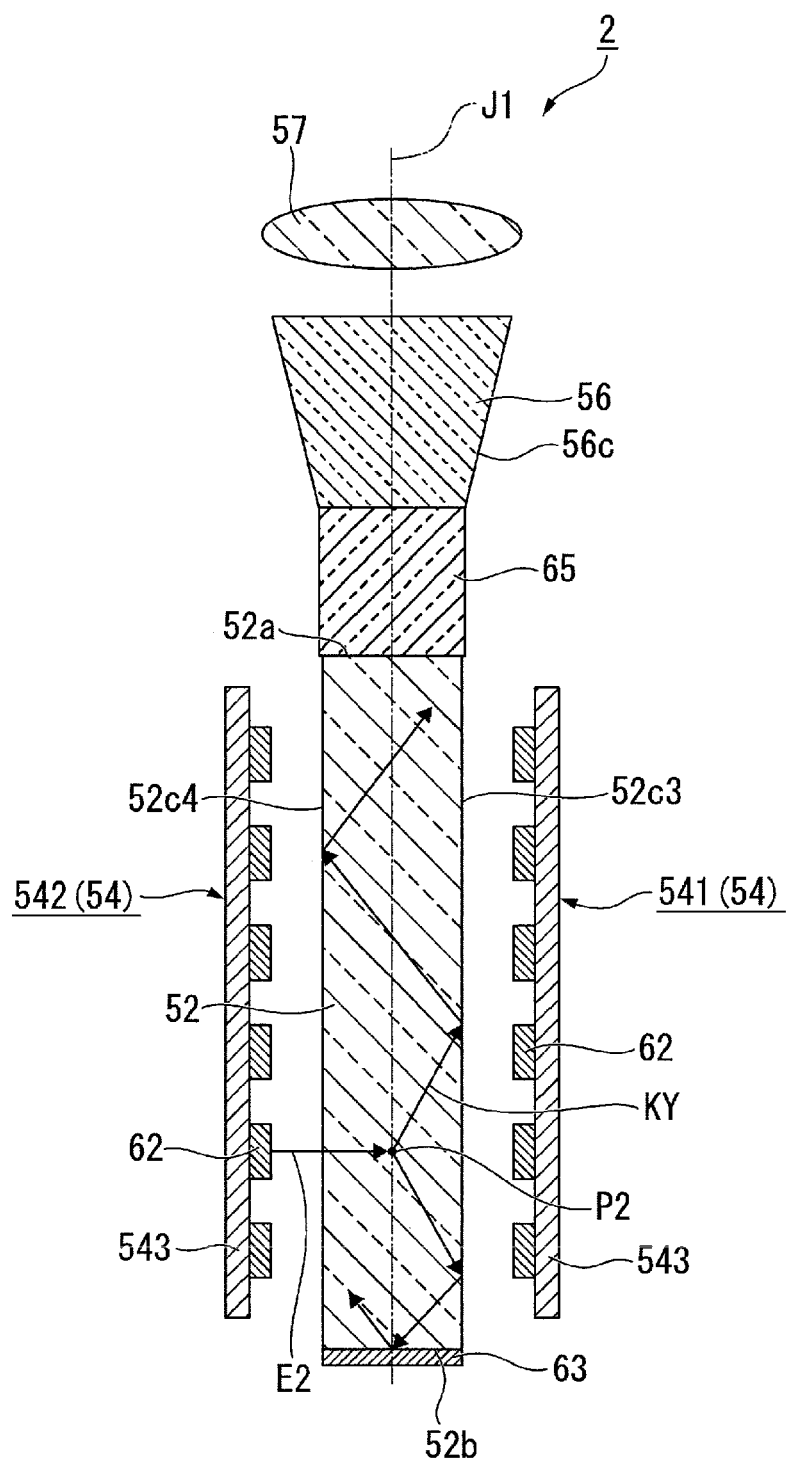
FIG. 4 is a cross-sectional view of the light source device along the line IV-IV shown in FIG. 2.

FIG. 2 is a schematic configuration diagram of the light source device 2. FIG. 3 is a cross-sectional view of the light source device 2 along the line shown in FIG. 2. FIG. 4 is a cross-sectional view of the light source device 2 along the line IV-IV shown in FIG. 2.

As shown in FIG. 2, the light source device 2 is provided with a first wavelength conversion rod 51 (a first wavelength conversion section), a second wavelength conversion rod 52 (a second wavelength conversion section), a light source 54, a light combining section 55, an angle conversion element 56, a collimator lens 57 and a control section 58.

As shown in FIG. 2 and FIG. 3, the first wavelength conversion rod 51 has a quadrangular prismatic shape, and has a first end surface 51a and a second end surface 51b opposed to each other, and four side surfaces 51c1, 51c2, 51c3 and 51c4 crossing the first end surface 51a and the second end surface 51b. The whole of the side surface constituted by the four side surfaces 51c1, 51c2, 51c3 and 51c4 corresponds to a first side surface in the appended claims.

As shown in FIG. 2 and FIG. 4, the second wavelength conversion rod 52 has a quadrangular prismatic shape, and has a third end surface 52a and a fourth end surface 52b opposed to each other, and four side surfaces 52c1, 52c2, 52c3 and 52c4 crossing the third end surface 52a and the fourth end surface 52b. The whole of the side surface constituted by the four side surfaces 52c1, 52c2, 52c3 and 52c4 corresponds to a second side surface in the appended claims. An axis passing through the center of the third end surface 52a and the center of the fourth end surface 52b of the second wavelength conversion rod 52 is defined as an optical axis J1 of the light source device 2. The light from the light source device 2 is emitted in a direction of the optical axis J1.

In the present embodiment, the first wavelength conversion rod 51 and the second wavelength conversion rod 52 have substantially the same dimensions. The length A in the longitudinal direction (a normal direction of the first end surface 51a) of the first wavelength conversion rod 51 is longer than the length B in the width direction (a normal direction of the side surface 51c1) of the first wavelength conversion rod 51. For example, the length A is about ten through several tens times as large as the length B. Substantially the same as the first wavelength conversion rod 51 applies also to the second wavelength rod 52.

It should be noted that each of the first wavelength conversion rod 51 and the second wavelength conversion rod 52 is not necessarily required to have the quadrangular prismatic shape, but can also have another polygonal shape such as a triangular prismatic shape. Alternatively, it is also possible for each of the first wavelength conversion rod 51 and the second wavelength conversion rod 52 to have a columnar shape. When each of the first wavelength conversion rod 51 and the second wavelength conversion rod 52 has a columnar shape, the first wavelength conversion rod 51 has a first end surface and a second end surface parallel to each other, and one side surface perpendicular to the first end surface and the second end surface. The second wavelength conversion rod 52 has a third end surface and a fourth end surface parallel to each other, and one side surface perpendicular to the third end surface and the fourth end surface.

The first wavelength conversion rod 51 and the second wavelength conversion rod 52 are disposed at a distance in an orientation in which the side surface 51c1 of the first wavelength conversion rod 51 and the side surface 52c1 of the second wavelength conversion rod 52 are opposed to each other. In other words, the side surface 51c1 of the first wavelength conversion rod 51 and the side surface 52c1 of the second wavelength conversion rod 52 are opposed to each other via an air layer. In other words, the first wavelength conversion rod 51 and the second wavelength conversion rod 52 are arranged in parallel to each other.

Hereinafter, for the sake of convenience of explanation, the end surface on the side where the light is emitted from the first wavelength conversion rod 51 is referred to as the first end surface 51a, and the end surface facing to the opposite side to the first end surface 51a is referred to as the second end surface 51b. Further, the end surface on the side where the light is emitted from the second wavelength conversion rod is referred to as the third end surface 52a, and the end surface facing to the opposite side to the third end surface 52a is referred to as the fourth end surface 52b.

As shown in FIG. 3 and FIG. 4, the light source 54 is provided with a first light source 541 and a second light source 542. As shown in FIG. 2, the first light source 541 is disposed so as to straddle the side surface 51c3 of the first wavelength conversion rod 51 and the side surface 52c3 of the second wavelength conversion rod 52. The second light source 542 is disposed so as to straddle the side surface 51c4 of the first wavelength conversion rod 51 and the side surface 52c4 of the second wavelength conversion rod 52. The light source 54 emits first excitation light and second excitation light. The side surface 51c3 and the side surface 51c4 of the first wavelength conversion rod 51 correspond to a third side surface of the appended claims. Further, the side surface 52c3 and the side surface 52c4 of the second wavelength conversion rod 52 correspond to a fourth side surface of the appended claims.

The first light source 541 and the second light source 542 have the same configuration, and are each provided with a substrate 543, and a plurality of light emitting diodes 61, 62 (LED) mounted on one surface of the substrate 543, the one surface being opposed to the first wavelength conversion rod 51 and the second wavelength conversion rod 52. In the present embodiment, each of the light sources is provided with the 12 LED 61, 62, but the number of the LED 61, 62 is not particularly limited. The LED 61 each emit the first excitation light. The LED 62 each emit the second excitation light. The wavelength band of the first excitation light and the second excitation light is an ultraviolet wavelength band, a violet wavelength band or a blue wavelength band in range of, for example, about 200 nm through 495 nm. It should be noted that each of the light sources 541, 542 can also be provided with other optical members such as a light guide plate, a diffusion plate or a lens besides the substrate 543 and the LED 61, 62.

The plurality of LED 61 is disposed so as to be opposed to the side surface 51c3 and the side surface 51c4 of the first wavelength conversion rod 51, and the plurality of LED 62 is disposed so as to be opposed to the side surface 52c3 and the side surface 52c4 of the second wavelength conversion rod 52. As shown in FIG. 2, the plurality of LED 61, 62 is arranged in two columns. Some (six) LED 61 are arranged along the longitudinal direction of the first wavelength conversion rod 51, and the remaining (six) LED 62 are arranged along the longitudinal direction of the second wavelength conversion rod 52. Hereinafter, the LED 61 arranged along the longitudinal direction of the first wavelength conversion rod 51 are referred to as first LED 61, and the LED 62 arranged along the longitudinal direction of the second wavelength conversion rod 52 are referred to as second LED 62.

The first excitation light E1 for exciting a first phosphor included in the first wavelength conversion rod 51 is emitted form the first LED 61. Meanwhile, the second excitation light E2 for exciting a second phosphor included in the second wavelength conversion rod 52 is emitted form the second LED 62. As described above, the first excitation light E1 emitted from the first LED 61 and the second excitation light E2 emitted from the second LED 62 are different in phosphor to excite from each other. Therefore, the first excitation light E1 and the second excitation light E2 can have respective wavelength bands which are optimized for the phosphors of the respective wavelength conversion rods 51, 52, and are therefore different from each other, or can also have the same wavelength band commonly used as the excitation light for either of the phosphors.

In the present embodiment, the light source 54 has the first LED 61 for emitting the first excitation light E1 in the ultraviolet wavelength band, and the second LED 62 for emitting the second excitation light E2 in the blue wavelength band.

As shown in FIG. 3, the first LED 61 are disposed so as to be opposed to the side surface 51c3 and the side surface 51c4 of the first wavelength conversion rod 51, and emit the first excitation light E1 in the first excitation wavelength band toward the side surface 51c3 and the side surface 51c4. The first excitation wavelength band is the ultraviolet wavelength band of, for example, 200 nm through 380 nm. It should be noted that the first excitation wavelength band can also be a violet wavelength band of, for example, around 400 nm. The first excitation light E1 enters the first wavelength conversion rod 51 from the side surface 51c3 and the side surface 51c4 of the first wavelength conversion rod 51.

As shown in FIG. 4, the second LED 62 are disposed so as to be opposed to the side surface 52c3 and the side surface 52c4 of the second wavelength conversion rod 52, and emit the second excitation light E2 in the second excitation wavelength band toward the side surface 52c3 and the side surface 52c4. The second excitation wavelength band is the blue wavelength band of, for example, 450 nm through 495 nm. It should be noted that the second excitation wavelength band can also be the ultraviolet wavelength band of, for example, 200 nm through 380 nm, or can also be the violet wavelength band of, for example, around 400 nm. The second excitation light E2 enters the second wavelength conversion rod 52 from the side surface 52c3 and the side surface 52c4 of the second wavelength conversion rod 52.

The first wavelength conversion rod 51 is formed of, for example, fluorescent glass obtained by dispersing rare-earth ions in the glass, or a material obtained by dispersing blue phosphor in a binder such as glass or resin. Specifically, as the fluorescent glass, there is used Lumilass (a trade name; made by Sumita Optical Glass, Inc.) or the like. As the blue phosphor (the first phosphor), there is used, for example, $BaMgAl_{10}O_{17}$:Eu(II). The first wavelength conversion rod 51 converts the first excitation light E1 into first fluorescence KB (blue light) in a first wavelength band. The first wavelength band is the blue wavelength band of, for example, 450 through 495 nm. The first fluorescence KB is emitted from the first end surface 51a of the first wavelength conversion rod 51 toward the light combining section 55.

The second wavelength conversion rod 52 is formed of a ceramic phosphor (polycrystalline phosphor) for converting the wavelength of the second excitation light E2 into the wavelength of second fluorescence KY in a second wavelength band. The second wavelength band is a yellow wavelength band of, for example, 490 through 750 nm. The second wavelength conversion rod 52 can also be formed of a single-crystal phosphor instead of the polycrystalline phosphor. Alternatively, the second wavelength conversion rod 52 can also be formed of fluorescent glass. Alternatively, the second wavelength conversion rod 52 can also be formed of a material obtained by dispersing a number of phosphor particles in a binder made of glass or resin. The second fluorescence KY is emitted from the third end surface 52a of the second wavelength conversion rod 52 toward the light combining section 55.

The second wavelength conversion rod 52 includes, for example, an yttrium aluminum garnet (YAG) phosphor as the yellow phosphor (the second phosphor). Citing YAG:Ce including cerium (Ce) as an activator agent as an example, as the material of the second wavelength conversion rod 52, there can be used a material obtained by mixing raw powder including constituent elements such as $Y_2O_3$, $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The first wavelength conversion rod 51 has a mirror disposed on the second end surface 51b of the first wavelength conversion rod 51. The second wavelength conversion rod 52 has the mirror 63 disposed on the fourth end surface 52b of the second wavelength conversion rod 52. Although in the present embodiment, the common mirror 63 is disposed so as to straddle the first wavelength conversion rod 51 and the second wavelength conversion rod 52 as shown in FIG. 2, it is also possible to provide the mirror 63 individually to the first wavelength conversion rod 51 and the second wavelength conversion rod 52. The mirror 63 is formed of a metal film or a dielectric multilayer film.

As shown in FIG. 2, the light combining section 55 is provided with a dichroic prism 65 and a prism 66. The dichroic prism 65 has contact with the third end surface 52a of the second wavelength conversion rod 52. The dichroic prism has a dichroic mirror 65m for reflecting the first fluorescence KB and transmitting the second fluorescence KY. The prism 66 has contact with the first end surface 51a of the first wavelength conversion rod 51. The prism 66 has a reflecting surface 66f for reflecting the first fluorescence KB toward the dichroic prism 65.

The prism 66 is formed of a prism shaped like a triangular prism having an isosceles right triangular cross-sectional shape, and has an end surface of incidence of light 66a, a reflecting surface 66f and a light exit end surface 66b. The prism 66 has a function of folding the light path of the first fluorescence KB, which has entered the prism 66, at an angle of 90° and then emitting the first fluorescence KB. In other words, the prism 66 reflects the first fluorescence KB, which has been emitted from the first end surface 51a of the first wavelength conversion rod 51, with the reflecting surface 66f to thereby fold the light path, and then emits the first fluorescence KB from the light exit end surface 66b. It should be noted that it is also possible to apply a reflecting plate having an equivalent function to the present disclosure as a substitute of the prism 66.

The dichroic prism 65 is disposed so as to be opposed to the light exit end surface 66b of the prism 66 and the third end surface 52a of the second wavelength conversion rod 52. The dichroic prism 65 has contact with the third end surface 52a of the second wavelength conversion rod 52. The dichroic prism 65 has a rectangular solid shape, and has an end surface of incidence of light 65a, an end surface of incidence of light 65b, and a light exit end surface 65c. The dichroic mirror 65m has a property of reflecting light in the blue wavelength band while transmitting light in the yellow wavelength band. Thus, the dichroic prism 65 combines the first fluorescence KB emitted from the first end surface 51a of the first wavelength conversion rod 51 and the second fluorescence KY emitted from the third end surface 52a of the second wavelength conversion rod 52 with each other. The composite light KW as the white light consisting of the first fluorescence KB as the blue fluorescence and the second fluorescence KY as the yellow fluorescence is emitted from the light combining section 55.

The angle conversion element 56 is disposed at the light exit side of the light exit end surface 65c of the dichroic prism 65. The angle conversion element 56 is formed of a taper rod having an end surface of incidence of light 56a which the composite light KW enters, and a light exit end surface 56b from which the composite light KW is emitted. The angle conversion element 56 has a truncated quadrangular pyramid shape, and the cross-sectional area perpendicular to the optical axis J1 increases along the proceeding direction of the composite light KW, and the area of the light exit end surface 56b is larger than the area of the end surface of incidence of light 56a. Thus, the composite light KW changes the angle to the direction parallel to the optical axis J1 every time the composite light KW is totally reflected by side surface 56c while proceeding inside the angle conversion element 56. In such a manner, the angle conversion element 56 makes the diffusion angle of the composite light KW in the light exit end surface 56b smaller than the diffusion angle of the composite light KW in the end surface of incidence of light 56a.

The angle conversion element 56 is fixed to the dichroic prism 65 so that the end surface of incidence of light 56a is opposed to the light exit end surface 65c of the dichroic prism 65. Specifically, the angle conversion element 56 and the dichroic prism 65 have contact with each other via an optical adhesive (not shown), and no air gap (no air layer) is disposed between the angle conversion element 56 and the dichroic prism 65. It should be noted that the angle conversion element 56 can also be fixed so as to have direct contact with the dichroic prism 65 by, for example, an arbitrary support member. In any case, it is desirable that no air gap exists between the angle conversion element 56 and the dichroic prism 65. It is desirable to make the refractive index of the angle conversion element 56 and the refractive index of the dichroic prism 65 coincide with each other as precise as possible.

It should be noted that it is also possible to use a compound parabolic concentrator (CPC) as the angle conversion element 56 instead of the taper rod. When using the CPC as the angle conversion element 56, it is also possible to obtain substantially the same advantages as those when using the taper rod.

The collimator lens 57 is disposed at the light exit side of the light exit end surface 56b of the angle conversion element 56. The collimator lens 57 collimates the composite light KW emitted from the angle conversion element 56. Therefore, parallelism of the composite light KW the angle distribution of which is converted by the angle conversion element 56 is further improved by the collimator lens 57. The collimator lens 57 is formed of a convex lens. It should be noted that when sufficient parallelism is obtained by the angle conversion element 56 alone, it is not necessarily required to provide the collimator lens 57.

The control section 58 controls the power to be supplied to the first LED 61 and the second LED 62 to thereby individually control the intensity of the first excitation light E1 emitted from the first LED 61 and the intensity of the second excitation light E2 emitted from the second LED 62.

The light source device 2 according to the present disclosure is provided with the light source 54, the first wavelength conversion rod 51 (the first wavelength conversion section), the second wavelength conversion rod 52 (the second wavelength conversion section), the prism 66 and the dichroic prism 65, wherein the light source 54 emits the light, the first wavelength conversion rod 51 includes the first phosphor, converts the light emitted from the light source 54 into the first fluorescence KB, and then emits the first fluorescence KB from the first end surface 51a (a first light exit surface), the second wavelength conversion rod 52 is disposed in parallel to the first wavelength conversion rod 51, includes the second phosphor, converts the light emitted from the light source 54 into the second fluorescence KY, and then emits the second fluorescence KY from the third end surface 52a (a second light exit surface), the prism 66 is disposed so as to be opposed to the first end surface 51a to reflect the first fluorescence KB emitted from the first wavelength conversion rod 51, the dichroic prism 65 is disposed so as to be opposed to the prism 66 and the third end surface 52a, and combines the first fluorescence KB emitted from the prism 66 and the second fluorescence KY emitted from the second wavelength conversion rod 52 with each other to emit the result, and the wavelength band of the first fluorescence KB and the wavelength band of the second fluorescence KY are different from each other.

Hereinafter, the behavior of the light in the light source device 2 having the configuration described above will be described.

As shown in FIG. 3, when the first excitation light E1 having been emitted from the first LED 61 enters the first wavelength conversion rod 51, the first phosphor included in the first wavelength conversion rod 51 is excited, and the first fluorescence KB is emitted from an arbitrary light emitting point P1. The first fluorescence KB proceeds from the arbitrary light emitting point P1 toward all directions, and the first fluorescence KB proceeding toward the side surface proceeds toward the first end surface 51a or the second end surface 51b while repeating the total reflection by the side surfaces. The first fluorescence KB having proceeded toward the first end surface 51a enters the prism 66. Meanwhile, the first fluorescence KB having proceeded toward the second end surface 51b is reflected by the mirror 63, and thus, the light path thereof is folded back, and then the first fluorescence KB proceeds toward the first end surface 51a.

Subsequently, as shown in FIG. 12, the first fluorescence KB, which has been emitted from the first end surface 51a of the first wavelength conversion rod 51, is reflected by the reflecting surface 66f of the prism 66, and thus, the light path thereof is folded, and then the first fluorescence KB enters the dichroic prism 65. It should be noted that it is desirable that a gap (an air layer) is provided between the prism 66 and the dichroic prism 65 so that the prism 66 and the dichroic prism 65 do not have direct contact with each other. By providing the gap between the prism 66 and the dichroic prism 65, the light small in incident angle out of the light having proceeded to the vicinity of the boundary between the prism 66 and the dichroic prism 65 can be prevented from failing to reach the dichroic mirror 65m and being leaked outside from the side surfaces of the angle conversion element 56. Further it is possible to prevent the second fluorescence KY from proceeding toward the prism 66, and thus, it is possible to improve the light use efficiency with respect to the second fluorescence KY. It should be noted that when giving higher priority to the use efficiency of the first fluorescence KB than the use efficiency of the second fluorescence KY, it is also possible to dispose a member such as glass between the prism 66 and the dichroic prism 65. According to this configuration, internal total reflection of the first fluorescence KB occurs between the prism 66 and the dichroic prism 65, and thus, it is possible to recursively guide the light returning to the first wavelength conversion rod 51 to the dichroic prism 65 side.

Meanwhile, as shown in FIG. 4, when the second excitation light E2 having been emitted from the second LED 62 enters the second wavelength conversion rod 52, the second phosphor included in the second wavelength conversion rod 52 is excited, and the second fluorescence KY is emitted from an arbitrary light emitting point P2. The second fluorescence KY proceeds from the arbitrary light emitting point P2 toward all directions, and the second fluorescence KY proceeding toward the side surfaces proceeds toward the third end surface 52a or the fourth end surface 52b while repeating the total reflection by the side surfaces. The second fluorescence KY having proceeded toward the third end surface 52a enters the dichroic prism 65 from the third end surface 52a. Meanwhile, the second fluorescence KY having proceeded toward the fourth end surface 52b is reflected by the mirror 63, and thus, the light path thereof is folded back, and then the second fluorescence KY proceeds toward the third end surface 52a.

As shown in FIG. 2, the first fluorescence KB having entered the dichroic prism 65 is reflected by the dichroic mirror 65m. Meanwhile, the second fluorescence KY having entered the dichroic prism 65 is transmitted through the dichroic mirror 65m. As a result, the first fluorescence KB as the blue fluorescence and the second fluorescence KY as the yellow fluorescence are combined with each other, and the composite light KW as the white light is emitted from the light exit end surface 65c of the dichroic prism 65. The composite light KW having been emitted from the dichroic prism 65 is collimated by the angle conversion element 56 and the collimator lens 57, and is then emitted from the light source device 2. The composite light KW (the illumination light WL) having been emitted from the light source device 2 proceeds toward the integrator optical system 31 as shown in FIG. 1.

In the light source device 2 according to the present embodiment, the first wavelength conversion rod 51 for emitting the first fluorescence KB and the second wavelength conversion rod 52 for emitting the second fluorescence KY are disposed so that the side surfaces 51c1, 52c1 are opposed to each other. Further, the dichroic prism 65 is disposed on the third end surface 52a of the second wavelength conversion rod 52. Further, the first light source 541 is disposed at the position opposed to the side surface 51c3 of the first wavelength conversion rod 51 and the side surface 52c3 of the second wavelength conversion rod 52, and the second light source 542 is disposed at the position opposed to the side surface 51c4 and the side surface 52c4. According to this configuration, it is possible for the present disclosure to realize the light source device 2 small in size and capable of emitting the white light.

Further, in general, the light emitted from the LED is larger in diffusion angle compared to the light emitted form the semiconductor laser. Therefore, the light source using the LED tends to be large in etendue determined by the product of the light emitting area of the light source and the solid angle of the light from the light source compared to the light source using the semiconductor laser. The increase in etendue of the light source device increases the light which cannot be taken by the optical system in the posterior stage of the light source device to cause deterioration of the light use efficiency as the projector. Therefore, when used as the light source device for the projector, it is desirable for the etendue to be as small as possible.

From that point of view, in the case of the light source device 2 according to the present embodiment, the light source 54 has the first LED 61 and the second LED 62, and the light large in diffusion angle emitted from each of the LED enters the first wavelength conversion rod 51 or the second wavelength conversion rod 52 from the side surface large in area. Meanwhile, the composite light KW as the white light is emitted from the light exit end surface 65c of the dichroic prism 65 having the size corresponding to the end surface sufficiently small in area compared to the side surfaces of the wavelength conversion rods 51, 52. As described above, according to the present embodiment, it is possible to substantively decrease the light emitting area, and thus it is possible to realize the light source device 2 small in etendue. As a result, by using this light source device 2 in the projector 1, it is possible to improve the light use efficiency in the optical system in the posterior stage of the light source device 2.

In the case of the present embodiment, since the first fluorescence KB as the blue fluorescence is emitted from the first wavelength conversion rod 51, the second fluorescence KY as the yellow fluorescence is emitted from the second wavelength conversion rod 52, and the composite light KW as the white light is obtained by combining the first fluorescence KB and the second fluorescence KY with each other, it is possible to adjust the white balance of the white light by adjusting the balance between the light intensity of the first fluorescence KB and the light intensity of the second fluorescence KY. As a specific adjustment method of the white balance, it is also possible to adopt a configuration in which, for example, the light source device 2 is provided with sensors for detecting the respective light intensities of the first fluorescence KB and the second fluorescence KY, and the control section 58 appropriately adjusts the electrical power to be supplied to the first LED 61 and the second LED 62 in accordance with the deviations of the respective light intensities detected by the sensors from a standard value to thereby individually control the intensity of the first excitation light E1 and the intensity of the second excitation light E2.

In the light source device 2 according to the present embodiment, since the first LED 61 are disposed so as to be opposed to the side surface 51c3 and the side surface 51c4 of the first wavelength conversion rod 51, and the second LED 62 are disposed so as to be opposed to the side surface 52c3 and the side surface 52c4 of the second wavelength conversion rod 52, it is possible to select the LED having the optimum excitation wavelength band with respect to each of the wavelength conversion rods 51, 52.

In the light source device 2 according to the present embodiment, since the angle conversion element 56 is disposed at the light exit side of the light combining section 55, it is possible to collimate the composite light KW emitted from the light combining section 55. Further, since the collimator lens 57 is disposed at the light exit side of the angle conversion element 56, it is possible to further improve the parallelism of the composite light KW. Thus, it is possible to improve the light use efficiency in the optical system in the posterior stage of the light source device 2.

In the light source device 2 according to the present embodiment, since the mirror 63 is disposed on the second end surface 51b of the first wavelength conversion rod 51 and the fourth end surface 52b of the second wavelength conversion rod 52, the first fluorescence KB and the second fluorescence KY can be prevented from being emitted from the side of the second end surface 51b and the fourth end surface 52b. Thus, it is possible to improve the use efficiency of the first fluorescence KB and the second fluorescence KY.

It is also possible to dispose a reflecting film formed of, for example, a metal film between the side surface 51c1 of the first wavelength conversion rod 51 and the side surface 52c1 of the second wavelength conversion rod 52 instead of the gap (the air layer). It should be noted that the light loss on the reflecting surface is smaller when disposing the air layer between the two wavelength conversion rods. Therefore, when placing importance on the light loss, it is preferable to dispose the air layer.

Specifically, since the side surface 51c1 of the first wavelength conversion rod 51 and the side surface 52c1 of the second wavelength conversion rod 52 are opposed to each other via the air layer, the reflection of the light on the side surfaces 51c1, 52c1 of the respective wavelength conversion rods 51, 52 becomes the total reflection not accompanied by the light loss. Thus, the light use efficiency can be improved. Further, it is desirable for each of the side surfaces of the respective wavelength conversion rods 51, 52 to smoothly be polished. Thus, it is possible to further suppress the light loss.

The projector 1 according to the present embodiment is equipped with the light source device 2 described above, and is therefore excellent in light use efficiency, and at the same time, reduction in size can be achieved.

It should be noted that it is also possible for the wavelength conversion rods 51, 52 and the light source 54 in the present embodiment to have the configuration of the modified example described below.

Modified Example

Figure 5:
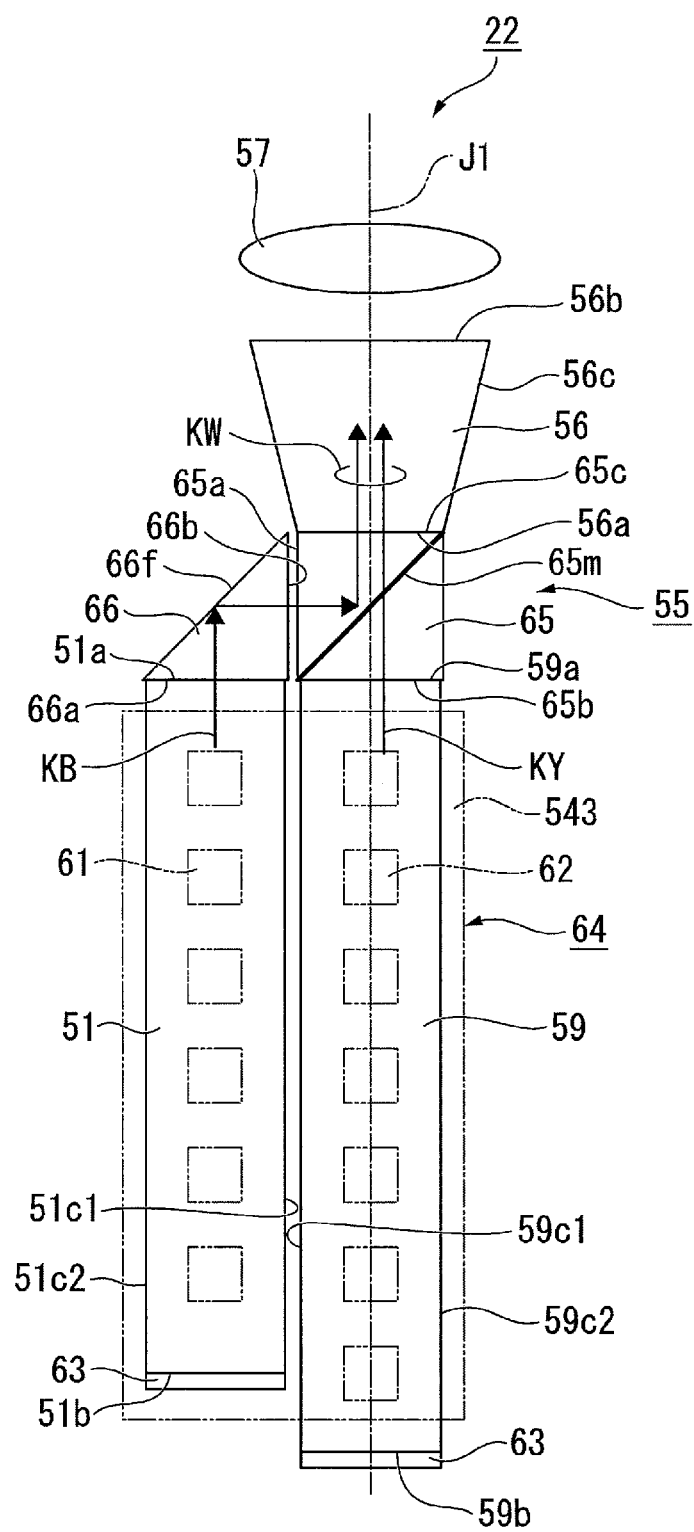
FIG. 5 is a cross-sectional view of a light source device according to a modified example of the first embodiment.

FIG. 5 is a schematic configuration diagram of a light source device 22 according to a modified example of the first embodiment. In FIG. 5, the constituents common to those shown in FIG. 2 are denoted by the same reference numerals, and the description thereof will be omitted.

As shown in FIG. 5, in the light source device according to the modified example, the first wavelength conversion rod 51 and a second wavelength conversion rod 59 have respective dimensions different from each other. Specifically, the length in the longitudinal direction of the second wavelength conversion rod 59 is longer than the length in the longitudinal direction of the second wavelength conversion rod 52 of the first embodiment. Thus, the length in the longitudinal direction of the second wavelength conversion rod 59 is made longer than the length in the longitudinal direction of the first wavelength conversion rod 51. The second wavelength conversion rod 59 has a third end surface 59a and a fourth end surface 59b opposed to each other, and side surfaces 59c1, 59c2 crossing the third end surface 59a and the fourth end surface 59b.

Further, the second LED 62 constituting the light source 64 is larger in number than the first LED 61 due to the fact that the second wavelength conversion rod 59 is longer than the first wavelength conversion rod 51.

The rest of the configuration of the light source device is substantially the same as that of the embodiment described above.

It is also possible to adjust the white balance in the design phase of the light source device by adopting a measure of making the first wavelength conversion rod 51 and the second wavelength conversion rod 59 different in length, or a measure of making the first LED 61 and the second LED 62 different in number as in the light source device 22 according to the modified example.

Second Embodiment

Hereinafter, a second embodiment of the present disclosure will be described using FIG. 6.

A light source device according to the second embodiment is substantially the same in basic configuration as that of the first embodiment, but is different from that of the first embodiment in the point that a reflective polarization element is added. Therefore, the description of the overall configuration of the light source device will be omitted.

Figure 6:
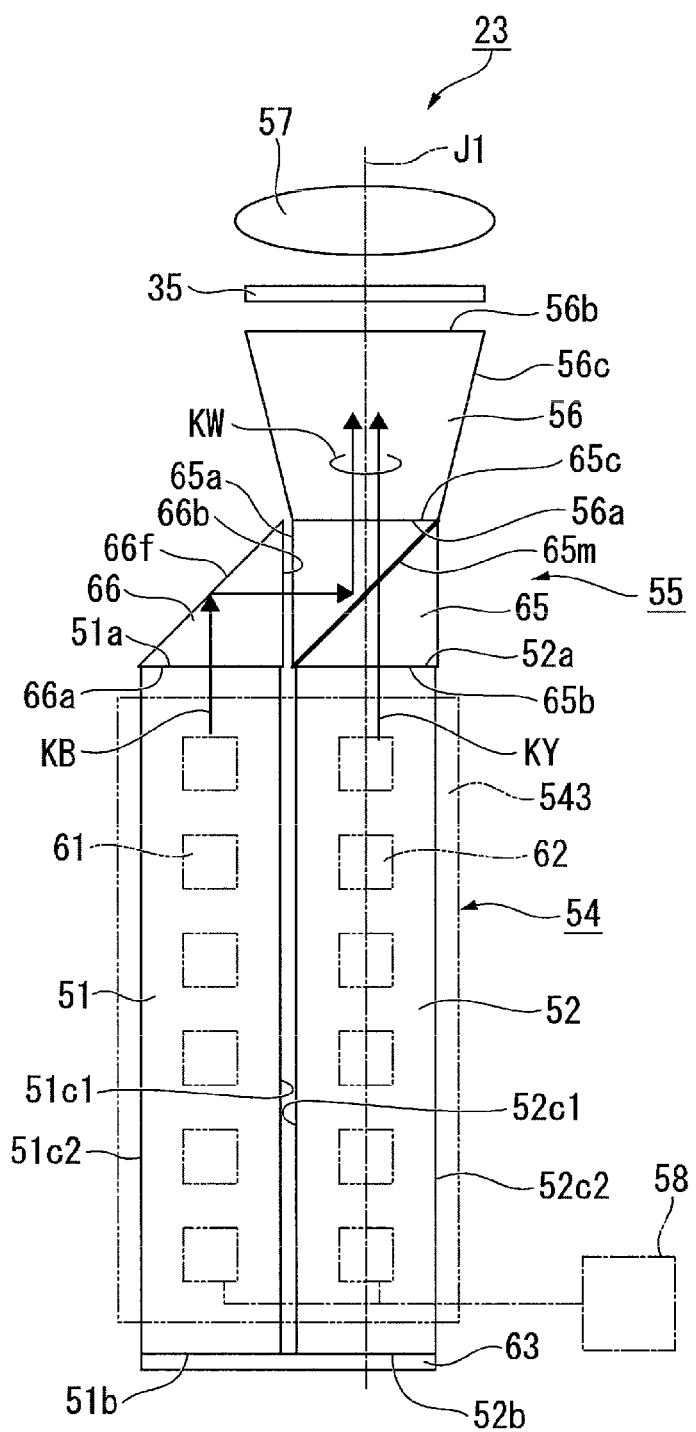
FIG. 6 is a schematic configuration diagram of a light source device according to a second embodiment.

FIG. 6 is a schematic configuration diagram of the light source device 23 according to the second embodiment.

In FIG. 6, the constituents common to those shown in FIG. 2 are denoted by the same reference numerals, and the description thereof will be omitted.

As shown in FIG. 6, the light source device 23 according to the second embodiment is provided with the first wavelength conversion rod 51, the second wavelength conversion rod 52, the light source 54, the light combining section 55, the angle conversion element 56, a reflective polarization plate 35 (the reflective polarization element), the collimator lens 57 and the control section 58.

The reflective polarization plate 35 is disposed at the exit side of the light combining section 55, and at the same time, on the light exit side of the angle conversion element 56. The composite light KW emitted from the angle conversion element 56 is the light emitted from the phosphor, and has no particular polarization direction. The reflective polarization plate 35 transmits the light with a first polarization direction out of the composite light KW having no particular polarization direction, and reflects the light with a second polarization direction different from the first polarization state. It should be noted that the light with the first polarization direction coincides in polarization direction with the light emitted from the polarization conversion element 32 shown in FIG. 1. Alternatively, when using the light source device 23 according to the present embodiment, since the polarization direction of the composite light KW is uniformed into the first polarization direction, the projector 1 is not required to be provided with the polarization conversion element 32.

The rest of the configuration of the light source device 23 is substantially the same as in the first embodiment.

Also in the second embodiment, it is possible to obtain substantially the same advantages as in the first embodiment such as the advantage that it is possible to realize the compact light source device 23 for emitting the white light, and the advantage that it is possible to realize the light source device 23 small in etendue.

Further, in the light source device 23 according to the second embodiment, the light with the second polarization direction having been reflected by the reflective polarization plate 35 returns to the first wavelength conversion rod 51 or the second wavelength conversion rod 52, and then reflected by the mirror 63 to enter the reflective polarization plate 35 once again. On this occasion, since the polarization direction of the light having entered the reflective polarization plate 35 has changed from the polarization direction of the light when first reflected by the reflective polarization plate 35, at least a part of the light is transmitted through the reflective polarization plate 35. As described above, according to the light source device 23 related to the second embodiment, it is possible to reuse the light with the polarization direction having been reflected by the reflective polarization plate 35, and thus, it is possible to obtain the composite light KW with the uniform polarization direction.

Further, the blue light out of the light having been reflected by the reflective polarization plate 35 is reflected by the dichroic mirror 65m to return to the first wavelength conversion rod 51, while the yellow light is transmitted through the dichroic mirror 65m to return to the second wavelength conversion rod 52. Therefore, there is no chance for the blue light to enter the second wavelength conversion rod 52 to be consumed by exciting the phosphor in the second wavelength conversion rod 52. Thus, according to the light source device 23 related to the second embodiment, there is obtained an advantage that the white balance of the composite light KW is maintained in addition to the fact that the reuse of the polarized light is achieved.

Third Embodiment

A third embodiment of the present disclosure will hereinafter be described using FIG. 7.

A light source device according to the third embodiment is substantially the same in basic configuration as that of the first embodiment, but is different in the configuration of the light source from that of the first embodiment. Therefore, the description of the overall configuration of the light source device will be omitted.

Figure 7:
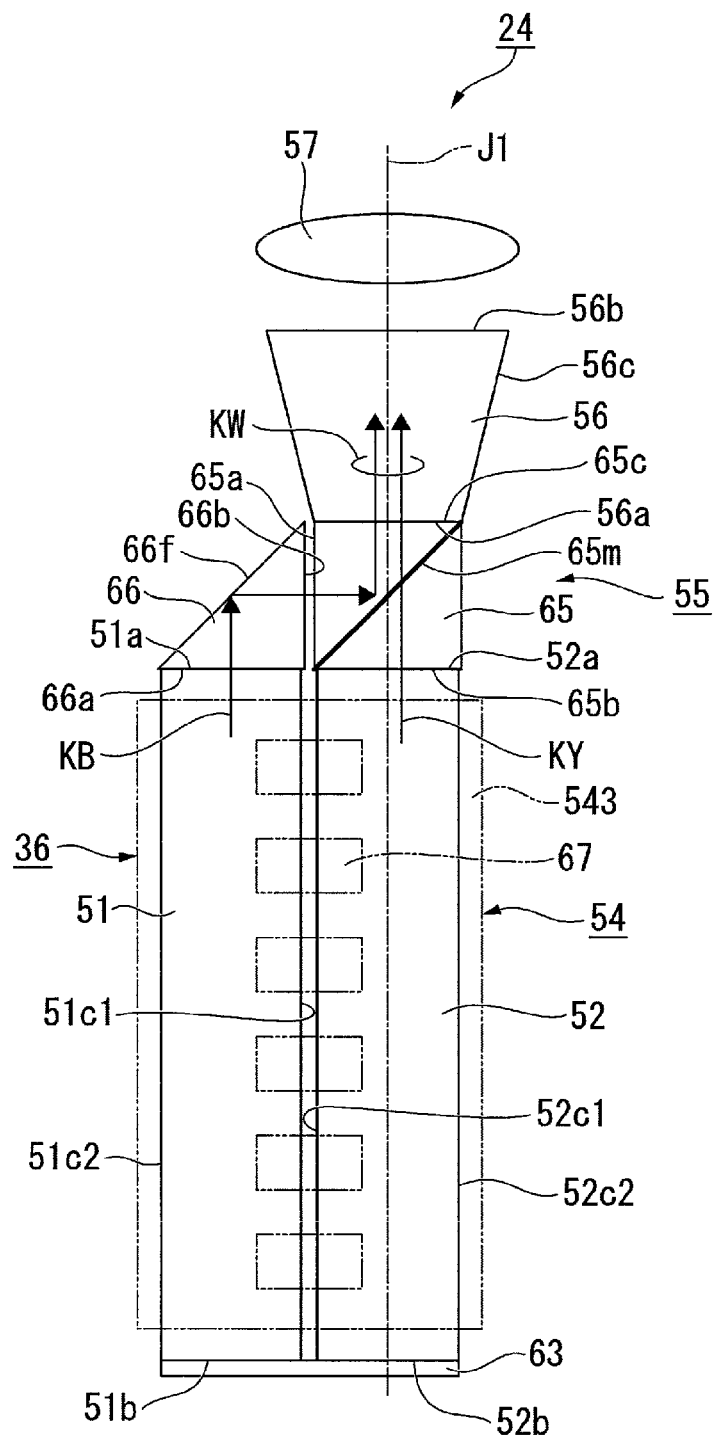
FIG. 7 is a schematic configuration diagram of a light source device according to a third embodiment.

FIG. 7 is a schematic configuration diagram of the light source device 24 according to the third embodiment.

In FIG. 7, the constituents common to those shown in FIG. 2 are denoted by the same reference numerals, and the description thereof will be omitted.

As shown in FIG. 7, the light source device 24 according to the third embodiment is provided with the first wavelength conversion rod 51, the second wavelength conversion rod 52, a light source 36, the light combining section 55, the angle conversion element 56 and the collimator lens 57.

The light source 36 is disposed at a position opposed to one side surface of each of the wavelength conversion rods 51, 52. It should be noted that it is also possible to further add a light source at a position opposed to another side surface of each of the wavelength conversion rods 51, 52 in addition to the light source 36.

The light source 36 is provided with a substrate 543, and a plurality of LED 67 mounted on a surface of the substrate 543, the surface being opposed to the first wavelength conversion rod 51 and the second wavelength conversion rod 52. In the present embodiment, the light source 36 is provided with the 6 LED 67, but the number of the LED 67 is not particularly limited. Each of the LED 67 emits the excitation light in the excitation wavelength band. The excitation wavelength band is the ultraviolet wavelength band of, for example, 200 nm through 380 nm. It should be noted that the excitation wavelength band can also be a violet wavelength band of, for example, around 400 nm.

Each of the LED 67 is disposed so as to be opposed to both of the first wavelength conversion rod 51 and the second wavelength conversion rod 52. In other words, one LED is disposed so as to straddle the first wavelength conversion rod 51 and the second wavelength conversion rod 52, and functions as both of the light source for the excitation light which is made to enter the first wavelength conversion rod 51 and the light source for the excitation light which is made to enter the second wavelength conversion rod 52. Therefore, the excitation light in the same excitation wavelength band enters the first wavelength conversion rod 51 and the second wavelength conversion rod 52. In the present embodiment, out of the excitation light emitted from the LED 67, the excitation light entering the first wavelength conversion rod 51 corresponds to the first excitation light, and the excitation light entering the second wavelength conversion rod 52 corresponds to the second excitation light.

The rest of the configuration of the light source device 24 is substantially the same as in the first embodiment.

Also in the third embodiment, it is possible to obtain substantially the same advantages as in the first embodiment such as the advantage that it is possible to realize the compact light source device 24 for emitting the white light, and the advantage that it is possible to realize the light source device 24 small in etendue.

Further, since each of the LED 67 is used by both of the first wavelength conversion rod 51 and the second wavelength conversion rod 52, the number of the LED 67 can be reduced, and the configuration of the light source 36 can be simplified.

Fourth Embodiment

A fourth embodiment of the present disclosure will hereinafter be described using FIG. 8.

A light source device according to the fourth embodiment is substantially the same in basic configuration as that of the first embodiment, but is different in the configuration of the wavelength conversion rods and the light source from that of the first embodiment. Therefore, the description of the overall configuration of the light source device will be omitted.

Figure 8:
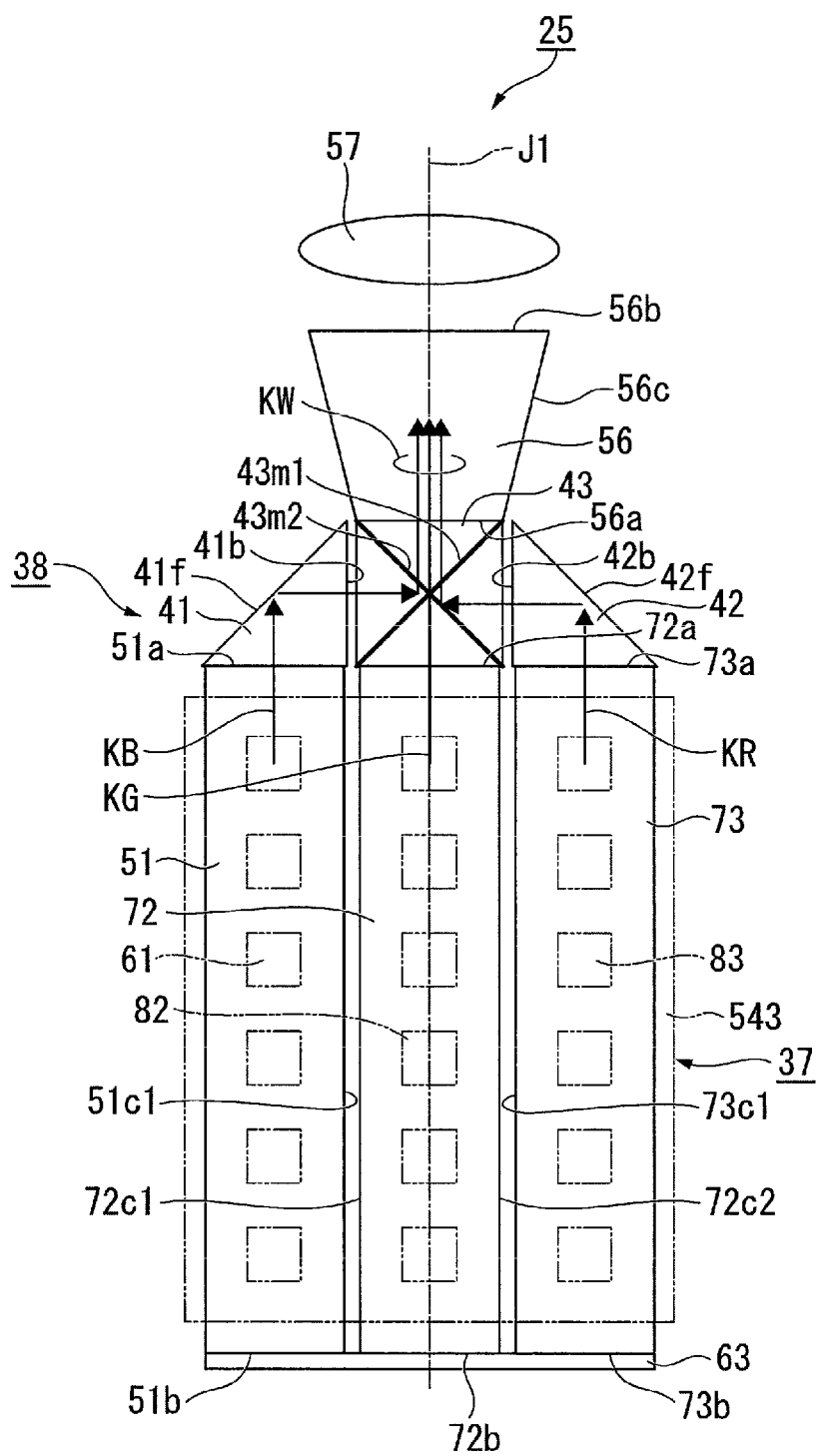
FIG. 8 is a schematic configuration diagram of a light source device according to a fourth embodiment.

FIG. 8 is a schematic configuration diagram of the light source device 25 according to the fourth embodiment.

In FIG. 8, the constituents common to those shown in FIG. 2 are denoted by the same reference numerals, and the description thereof will be omitted.

As shown in FIG. 8, the light source device 25 according to the fourth embodiment is provided with the first wavelength conversion rod 51, a second wavelength conversion rod 72, a third wavelength conversion rod 73, a light source 37, a light combining section 38, the angle conversion element 56 and the collimator lens 57.

The first wavelength conversion rod 51 and the second wavelength conversion rod 72 are disposed at a distance in an orientation in which the side surface 51c1 of the first wavelength conversion rod 51 and a side surface 72c1 of the second wavelength conversion rod 72 are opposed to each other. The second wavelength conversion rod 72 and the third wavelength conversion rod 73 are disposed at a distance in an orientation in which a side surface 72c2 of the second wavelength conversion rod 72 and a side surface 73c1 of the third wavelength conversion rod 73 are opposed to each other.

The light source 37 is disposed at a position opposed to one side surface of each of the wavelength conversion rods 51, 72 and 73. It should be noted that it is also possible to further add a light source at a position opposed to another side surface of each of the wavelength conversion rods 51, 72 and 73 in addition to the light source 37.

The light source 37 is provided with the substrate 543, and a plurality of LED 61, 82 and 83 mounted on a surface of the substrate 543, the surface being opposed to the first wavelength conversion rod 51, the second wavelength conversion rod 72, and the third wavelength conversion rod 73. In the present embodiment, the light source 37 is provided with the 18 LED 61, 82 and 83 in total, but the number of the LED 61, 82 and 83 is not particularly limited. The LED 61, 82 and 83 emit the first excitation light, the second excitation light and third excitation light, respectively. It should be noted that the light source 37 can also have other optical members such as a light guide plate, a diffusion plate or a lens besides the substrate 543 and the LED 61, 82 and 83.

The plurality of LED 61, the plurality of LED 82 and the plurality of LED 83 are disposed so as to be opposed to the side surface of the first wavelength conversion rod 51, the side surface of the second wavelength conversion rod 72 and the side surface of the third wavelength conversion rod 73, respectively. As shown in FIG. 8, the plurality of LED 61, the plurality of LED 82 and the plurality of LED 83 are arranged in three columns. Some (six) LED 61 are arranged along the longitudinal direction of the first wavelength conversion rod 51, other (six) LED 82 are arranged along the longitudinal direction of the second wavelength conversion rod 72, and still other (six) LED 83 are arranged along the longitudinal direction of the third wavelength conversion rod 73. Hereinafter, the LED arranged along the longitudinal direction of the first wavelength conversion rod 51 are referred to as first LED 61, the LED arranged along the longitudinal direction of the second wavelength conversion rod 72 are referred to as second LED 82, and the LED arranged along the longitudinal direction of the third wavelength conversion rod 73 are referred to as third LED 83.

The first excitation light for exciting the first phosphor included in the first wavelength conversion rod 51 is emitted form the first LED 61. The second excitation light for exciting the second phosphor included in the second wavelength conversion rod 72 is emitted form the second LED 82. The second excitation light for exciting third phosphor included in the third wavelength conversion rod 73 is emitted form the third LED 83. As described above, the first excitation light, the second excitation light and the third excitation light are different in phosphor to excite from each other. Therefore, it is possible for the first LED 61, the second LED 82 and the third LED 83 to emit light in respective excitation wavelength bands which are optimized for the phosphors of the respective wavelength conversion rods 51, 72 and 73, and are therefore different from each other, or emit light in the same excitation wavelength band commonly used as the excitation light for all of the phosphors.

In the present embodiment, the first LED 61 are disposed so as to be opposed to the side surfaces of the first wavelength conversion rod 51, and emit the first excitation light in the first excitation wavelength band toward the side surface. The first excitation wavelength band is the ultraviolet wavelength band of, for example, 200 nm through 380 nm. It should be noted that the first excitation wavelength band can also be a violet wavelength band of, for example, around 400 nm.

The second LED 82 are disposed so as to be opposed to the side surface of the second wavelength conversion rod 72, and emit the second excitation light in the second excitation wavelength band toward the side surface. The second excitation wavelength band is the blue wavelength band of, for example, 450 nm through 495 nm. It should be noted that the second excitation wavelength band can also be the ultraviolet wavelength band of, for example, 200 nm through 380 nm, or can also be the violet wavelength band around 400 nm.

The third LED 83 are disposed so as to be opposed to the side surface of the third wavelength conversion rod 73, and emit the third excitation light in a third excitation wavelength band toward the side surface. The third excitation wavelength band is the blue wavelength band of, for example, 450 nm through 495 nm. It should be noted that the third excitation wavelength band can also be the ultraviolet wavelength band of, for example, 200 nm through 380 nm, or can also be the violet wavelength band around 400 nm.

The first wavelength conversion rod 51 converts the first excitation light into first fluorescence KB (blue light) in a first wavelength band. The first wavelength band is the blue wavelength band of, for example, 450 through 495 nm. The first wavelength conversion rod 51 is formed of, for example, fluorescent glass obtained by dispersing rare-earth ions in the glass, or a material obtained by dispersing blue phosphor in a binder such as glass or resin. Specifically, as the fluorescent glass, there is used Lumilass (a trade name; made by Sumita Optical Glass, Inc.) or the like. As the blue phosphor (a first phosphor), there is used, for example, $BaMgAl_{10}O_{17}:Eu(II)$.

The second wavelength conversion rod 72 converts the second excitation light into second fluorescence KG (green light) in a second wavelength band. The second wavelength band is a green wavelength band of, for example, 500 through 570 nm. The second wavelength conversion rod 72 includes the phosphor material such as a $Lu_3Al_5O_{12}:Ce^{3+}$ phosphor, a $Y_3O_4:Eu^{2+}$ phosphor, a $(Ba,Sr)_2SiO_4:Eu^{2+}$ phosphor, a $Ba_3Si_6O_{12}N_2:Eu^{2+}$ phosphor or a $(Si,Al)_6(O,N)_8:Eu^{2+}$ phosphor as a green phosphor (a second phosphor).

The third wavelength conversion rod 73 converts the third excitation light into third fluorescence KR (red light) in a third wavelength band. The third wavelength band is a red wavelength band of, for example, 600 through 800 nm. The third wavelength conversion rod 73 includes, for example, the YAG phosphor (any one of Pr:YAG, Eu:YAG and Cr:YAG) made of $(Y_{1-x},Gd_x)_3(Al,Ga)_5O_{12}$ having any one of Pr, Eu and Cr dispersed as an activator agent as a red phosphor (a third phosphor). It should be noted that it is possible for the activator agent to include a species selected from Pr, Eu and Cr, or to be a coactivation type activator agent including two or more species selected from Pr, Eu and Cr.

The first wavelength conversion rod 51 has the mirror disposed on the second end surface 51*b* of the first wavelength conversion rod 51. The second wavelength conversion rod 72 has the mirror 63 disposed on a fourth end surface 72*b* of the second wavelength conversion rod 72. The third wavelength conversion rod 73 has the mirror 63 disposed on a sixth end surface 73*b* of the third wavelength conversion rod 73. In the present embodiment, the mirror 63 common to all of the first wavelength conversion rod 51, the second wavelength conversion rod 72 and the third wavelength conversion rod 73 is disposed, but the mirror 63 can also be provided individually to each of the wavelength conversion rods. The mirror 63 is formed of a metal film or a dielectric multilayer film formed on the end surface of each of the wavelength conversion rods 51, 72 and 73.

The light combining section 38 is provided with a first prism 41, a second prism 42 and a dichroic prism 43. The light combining section 38 combines the first fluorescence KB, the second fluorescence KG and the third fluorescence KR with each other.

The first prism 41 is disposed on the first end surface 51*a* of the first wavelength conversion rod 51. The first prism 41 reflects the first fluorescence KB (the blue light), which has been emitted from the first end surface 51*a* of the first wavelength conversion rod 51, with a reflecting surface 41*f* to thereby fold the light path as much as 90°, and then emits the first fluorescence KB from a light exit end surface 41*b*.

The second prism 42 is disposed on a fifth end surface 73*a* of the third wavelength conversion rod 73. The second prism 42 reflects the third fluorescence KR (the red light), which has been emitted from the fifth end surface 73*a* of the third wavelength conversion rod 73, with a reflecting surface 42*f* to thereby fold the light path as much as 90°, and then emits the third fluorescence KB from a light exit end surface 42*b*.

The dichroic prism 43 is disposed so as to be opposed to the light exit end surface 41*b* of the first prism 41, the light exit end surface 42*b* of the second prism 42 and the third end surface 72*a* of the second wavelength conversion rod 72. The dichroic prism 43 has a first dichroic mirror 43*m*1 and a second dichroic mirror 43*m*2 crossing each other. The first dichroic mirror 43*m*1 reflects the first fluorescence KB (the blue light) and transmits the second fluorescence KG (the green light) and the third fluorescence KR (the red light). The second dichroic mirror 43*m*2 reflects the third fluorescence KR (the red light) and transmits the first fluorescence KB (the blue light) and the second fluorescence KG (the green light). Thus, the dichroic prism 43 combines the first fluorescence KB emitted from the first wavelength conversion rod 51, the second fluorescence KG emitted from the second wavelength conversion rod 72 and the third fluorescence KR emitted from the third wavelength conversion rod 73 with each other to emit the composite light KW.

The rest of the configuration of the light source device 25 is substantially the same as in the first embodiment.

Also in the fourth embodiment, it is possible to obtain substantially the same advantages as in the first embodiment such as the advantage that it is possible to realize the compact light source device 25 for emitting the white light, and the advantage that it is possible to realize the light source device 25 small in etendue.

It should be noted that it is also possible for the light source device 25 to be provided with a control section for individually controlling the intensity of the first excitation light emitted from the first LED 61, the intensity of the second excitation light emitted from the second LED 82, and the intensity of the third excitation light emitted from the third LED 83. According to this configuration, by the control section appropriately adjusting the light intensities of the first fluorescence (the blue light), the second fluorescence (the green light) and the third fluorescence (the red light), it is possible to adjust the white balance of the composite light KW.

It should be noted that the scope of the present disclosure is not limited to the embodiments described above, but a variety of modifications can be provided thereto within the scope or the spirit of the present disclosure.

For example, there is cited the example in which the wavelength conversion rod includes the phosphor for emitting the yellow fluorescence in the first embodiment described above, it is also possible for the wavelength conversion rod to include two types of phosphor consisting of the phosphor for emitting the green fluorescence and the phosphor for emitting the red fluorescence. In that case, it is possible for the two types of phosphor to be homogenously mixed inside the wavelength conversion rod, or to be eccentrically located in separate areas.

Further, the dichroic prism constituting the light combining section can be reversed in the relationship between the reflected light and the transmitted light from the first through third embodiments described above. In other words, it is possible for the light combining section to be provided with a dichroic prism having a dichroic mirror for transmitting the first fluorescence (the blue light) emitted from the first wavelength conversion rod and reflecting the second fluorescence (the yellow light) emitted from the second wavelength conversion rod. In this case, the dichroic prism is disposed on the first end surface of the first wavelength conversion rod, and the prism for bending the light path is disposed on the first end surface of the second wavelength conversion rod.

Further, in each of the embodiments described above, it is also possible to dispose a dichroic mirror for reflecting the first excitation light and transmitting the first fluorescence on the first end surface of the first wavelength conversion rod. Similarly, it is also possible to dispose a dichroic mirror for reflecting the second excitation light and transmitting the second fluorescence on the third end surface of the second wavelength conversion rod. Similarly, in the fourth embodiment, it is possible to dispose a dichroic mirror for reflecting the third excitation light and transmitting the third fluorescence on the fifth end surface of the third wavelength conversion rod. According to these configurations, it is possible to improve the wavelength conversion efficiency in each of the wavelength conversion rods. Further, it is also possible to dispose a dichroic mirror for transmitting the excitation light and reflecting the fluorescence on the side surface of each of the wavelength conversion rods.

Although in the embodiments described above, there is cited the example of the light source device for emitting the white light, the present disclosure can also be applied to a light source device for emitting other colored light than the white light. For example, it is also possible to configure a light source device which is provided with a wavelength conversion rod for emitting the green light and a wavelength conversion rod for emitting the red light, and emits the yellow light. Even in that case, according to the present disclosure, it is possible to realize a compact light source device for emitting the yellow light.

Although in the embodiments described above, there is proposed the example of using the dichroic prism as the light combining section, it is also possible to apply other optical members capable of performing light composition. For example, a scattering body having a light scattering structure inside can also be used as the light combining section. As an example of the scattering body, there can be cited glass including scattering particles, an optical member including an anisotropic scattering layer, and so on.

Further, the specific configurations such as the shape, the number, the arrangement, and the material of each of the constituents constituting the light source device are not limited to those of the embodiments described above, but can arbitrarily be modified.

Although in the first embodiment described above, there is described an example when applying the present disclosure to the transmissive liquid crystal projector, the present disclosure can also be applied to a reflective liquid crystal projector. Here, "transmissive" means that the liquid crystal light valve including the liquid crystal panel and so on has a configuration of transmitting the light. The term "reflective" means that the liquid crystal light valve has a configuration of reflecting the light.

Although in the first embodiment described above, there is cited the example of the projector using three liquid crystal panels, the present disclosure can also be applied to a projector using one liquid crystal light valve alone or a projector using four or more liquid crystal light valves.

Although in the embodiments described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
    a light source configured to emit first excitation light and second excitation light;
    a first wavelength conversion section including a first phosphor, and configured to convert the first excitation light into first fluorescence having a first wavelength band different from a wavelength band of the first excitation light;
    a second wavelength conversion section including a second phosphor, and configured to convert the second excitation light into second fluorescence having a second wavelength band different from a wavelength band of the second excitation light and the first wavelength band; and
    a light combining section configured to combine the first fluorescence emitted from the first wavelength conversion section and the second fluorescence emitted from the second wavelength conversion section with each other, wherein
    the first wavelength conversion section has a first end surface and a second end surface opposed to each other, and a first side surface connected to and extending perpendicular to the first end surface and the second end surface,
    the second wavelength conversion section has a third end surface and a fourth end surface opposed to each other, and a second side surface connected to and extending perpendicular to the third end surface and the fourth end surface,
    the first side surface of the first wavelength conversion section and the second side surface of the second wavelength conversion section (i) face each other in a direction parallel to a direction in which the first, second, third and fourth end surfaces extend and (ii) extend parallel to each other in a direction toward the light combining section,
    the first fluorescence is emitted from the first end surface of the first wavelength conversion section toward the light combining section,
    the second fluorescence is emitted from the third end surface of the second wavelength conversion section toward the light combining section, and
    the second wavelength conversion section has a length in the direction toward the light combining section, extending from the third end surface to the fourth end surface, that is different from a length of the first wavelength conversion in the direction toward the light combining section, extending from the first end surface to the second end surface.

2. The light source device according to claim 1, wherein
    the first wavelength conversion section has a third side surface crossing the first end surface and the second end surface,
    the second wavelength conversion section has a fourth side surface crossing the third end surface and the fourth end surface, the first excitation light enters the first wavelength conversion section from the third side surface of the first wavelength conversion section, and the second excitation light enters the second wavelength conversion section from the fourth side surface of the second wavelength conversion section.

3. The light source device according to claim 2, wherein the light source includes a first light emitting diode disposed so as to be opposed to the third side surface of the first wavelength conversion section, and configured to emit the first excitation light, and a second light emitting diode disposed so as to be opposed to the fourth side surface of the second wavelength conversion section, and configured to emit the second excitation light.

4. The light source device according to claim 3, further comprising:

a control section configured to individually control an intensity of the first excitation light to be emitted from the first light emitting diode and an intensity of the second excitation light emitted from the second light emitting diode.

5. The light source device according to claim 1, wherein the light combining section includes a dichroic prism provided to one of the first end surface of the first wavelength conversion section and the third end surface of the second wavelength conversion section, and having a dichroic mirror configured to reflect one of the first fluorescence and the second fluorescence and transmit the other of the first fluorescence and the second fluorescence, and a prism provided to the other of the first end surface of the first wavelength conversion section and the third end surface of the second wavelength conversion section, and having a reflecting surface configured to reflect one of the first fluorescence and the second fluorescence toward the dichroic prism.

6. The light source device according to claim 5, wherein the dichroic prism has contact with the third end surface of the second wavelength conversion section.

7. The light source device according to claim 5, wherein the prism has contact with the first end surface of the first wavelength conversion section.

8. The light source device according to claim 1, wherein the first side surface of the first wavelength conversion section and the second side surface of the second wavelength conversion section are opposed to each other via an air layer.

9. The light source device according to claim 1, wherein the first wavelength band is a blue wavelength band, and the second wavelength band is a yellow wavelength band.

10. The light source device according to claim 1, further comprising:

a third wavelength conversion section including a third phosphor, and configured to emit third fluorescence having a third wavelength band different from the first wavelength band and the second wavelength band, wherein the light combining section combines the first fluorescence, the second fluorescence and the third fluorescence with each other.

11. The light source device according to claim 10, wherein the light source emits third excitation light, and the third wavelength conversion section converts the third excitation light into the third fluorescence having the third wavelength band different from a wavelength band of the third excitation light.

12. The light source device according to claim 10, wherein the first wavelength band is a blue wavelength band, the second wavelength band is a green wavelength band and the third wavelength band is a red wavelength band.

13. The light source device according to claim 1, further comprising:

an angle conversion element which is disposed at a light exit side of the light combining section, which includes an end surface of incidence of light and a light exit end surface, and which makes a diffusion angle in the light exit end surface smaller than a diffusion angle in the end surface of incidence of light.

14. The light source device according to claim 1, further comprising:

a reflective polarization element disposed at a light exit side of the light combining section, and configured to transmit light with a first polarization direction and reflect light with a second polarization direction different from the first polarization direction.

15. A light source device comprising:

a light source configured to emit light;

a first wavelength conversion section including a first phosphor, and configured to convert the light emitted from the light source into first fluorescence, and emit the first fluorescence from a first light exit surface;

a second wavelength conversion section disposed in parallel to the first wavelength conversion section, including a second phosphor, and configured to convert the light emitted from the light source into second fluorescence, and emit the second fluorescence from a second light exit surface;

a prism disposed so as to be opposed to the first light exit surface, and configured to reflect the first fluorescence emitted from the first wavelength conversion section; and a dichroic prism disposed so as to be opposed to the prism and the second light exit surface, and configured to combine the first fluorescence emitted from the prism and the second fluorescence emitted from the second wavelength conversion section with each other to emit light obtained by combining the first fluorescence and the second fluorescence with each other, wherein the first fluorescence and the second fluorescence are different in wavelength band from each other, and the first wavelength conversion section has a first side surface through which the light from the light source enters the first wavelength conversion section, the second wavelength conversion section has a second side surface through which the light from the light source enters the second wavelength conversion section, and the light source includes a first substrate positioned straddling both the first side surface and the second side surface.

16. A projector comprising:

the light source device according to claim 1;

a light modulation device configured to modulate light from the light source device in accordance with image information; and a projection optical device configured to project the light modulated by the light modulation device.

17. A light source device comprising:

a light source configured to emit first excitation light and second excitation light;

a first wavelength conversion section including a first phosphor, and configured to convert the first excitation light into first fluorescence having a first wavelength band different from a wavelength band of the first excitation light;
a second wavelength conversion section including a second phosphor, and configured to convert the second excitation light into second fluorescence having a second wavelength band different from a wavelength band of the second excitation light and the first wavelength band; and
a light combining section configured to combine the first fluorescence emitted from the first wavelength conversion section and the second fluorescence emitted from the second wavelength conversion section with each other, wherein
the first wavelength conversion section has a first end surface and a second end surface opposed to each other, and a first side surface crossing the first end surface and the second end surface,
the second wavelength conversion section has a third end surface and a fourth end surface opposed to each other, and a second side surface crossing the third end surface and the fourth end surface,
the first side surface of the first wavelength conversion section and the second side surface of the second wavelength conversion section are opposed to each other,
the first fluorescence is emitted from the first end surface of the first wavelength conversion section toward the light combining section,
the second fluorescence is emitted from the third end surface of the second wavelength conversion section toward the light combining section,
the light combining section includes
a dichroic prism provided to one of the first end surface of the first wavelength conversion section and the third end surface of the second wavelength conversion section, and having a dichroic mirror configured to reflect one of the first fluorescence and the second fluorescence and transmit the other of the first fluorescence and the second fluorescence, and
a prism provided to the other of the first end surface of the first wavelength conversion section and the third end surface of the second wavelength conversion section, and having a reflecting surface configured to reflect one of the first fluorescence and the second fluorescence toward the dichroic prism, and
a light exit end surface of the prism and a light incidence end surface of the dichroic prism face each other via a gap.

18. A light source device comprising:
a light source configured to emit first excitation light and second excitation light;
a first wavelength conversion section including a first phosphor, and configured to convert the first excitation light into first fluorescence having a first wavelength band different from a wavelength band of the first excitation light;
a second wavelength conversion section including a second phosphor, and configured to convert the second excitation light into second fluorescence having a second wavelength band different from a wavelength band of the second excitation light and the first wavelength band; and
a light combining section configured to combine the first fluorescence emitted from the first wavelength conversion section and the second fluorescence emitted from the second wavelength conversion section with each other, wherein
the first wavelength conversion section has a first end surface and a second end surface opposed to each other, and a first side surface crossing the first end surface and the second end surface,
the second wavelength conversion section has a third end surface and a fourth end surface opposed to each other, and a second side surface crossing the third end surface and the fourth end surface,
the first side surface of the first wavelength conversion section and the second side surface of the second wavelength conversion section are opposed to each other,
the first fluorescence is emitted from the first end surface of the first wavelength conversion section toward the light combining section,
the second fluorescence is emitted from the third end surface of the second wavelength conversion section toward the light combining section,
the light combining section includes
a dichroic prism provided to one of the first end surface of the first wavelength conversion section and the third end surface of the second wavelength conversion section, and having a dichroic mirror configured to reflect one of the first fluorescence and the second fluorescence and transmit the other of the first fluorescence and the second fluorescence, and
a prism provided to the other of the first end surface of the first wavelength conversion section and the third end surface of the second wavelength conversion section, and having a reflecting surface configured to reflect one of the first fluorescence and the second fluorescence toward the dichroic prism, and
a light exit end surface of the prism and a light incidence end surface of the dichroic prism face each other via a transparent member.

19. A light source device comprising:
a light source configured to emit light;
a first wavelength conversion section including a first phosphor, and configured to convert the light emitted from the light source into first fluorescence, and emit the first fluorescence from a first light exit surface;
a second wavelength conversion section disposed in parallel to the first wavelength conversion section, including a second phosphor, and configured to convert the light emitted from the light source into second fluorescence, and emit the second fluorescence from a second light exit surface;
a prism disposed so as to be opposed to the first light exit surface, and configured to reflect the first fluorescence emitted from the first wavelength conversion section; and
a dichroic prism disposed so as to be opposed to the prism and the second light exit surface, and configured to combine the first fluorescence emitted from the prism and the second fluorescence emitted from the second wavelength conversion section with each other to emit light obtained by combining the first fluorescence and the second fluorescence with each other, wherein
the first fluorescence and the second fluorescence are different in wavelength band from each other, and
a light exit end surface of the prism and a light incidence end surface of the dichroic prism face each other via a gap.

20. A light source device comprising:
a light source configured to emit light;
a first wavelength conversion section including a first phosphor, and configured to convert the light emitted from the light source into first fluorescence, and emit the first fluorescence from a first light exit surface;
a second wavelength conversion section disposed in parallel to the first wavelength conversion section, including a second phosphor, and configured to convert the light emitted from the light source into second fluorescence, and emit the second fluorescence from a second light exit surface;
a prism disposed so as to be opposed to the first light exit surface, and configured to reflect the first fluorescence emitted from the first wavelength conversion section; and
a dichroic prism disposed so as to be opposed to the prism and the second light exit surface, and configured to combine the first fluorescence emitted from the prism and the second fluorescence emitted from the second wavelength conversion section with each other to emit light obtained by combining the first fluorescence and the second fluorescence with each other, wherein
the first fluorescence and the second fluorescence are different in wavelength band from each other, and
a light exit end surface of the prism and a light incidence end surface of the dichroic prism face each other via a transparent member.

* * * * *